United States Patent [19]

Cheal et al.

[11] 4,381,427
[45] Apr. 26, 1983

[54] SUBSCRIBER LOOP SYSTEM FOR VOICE AND DATA

[75] Inventors: William E. Cheal, San Jose; Gokal C. Gupta, Fremont; Faramarz Sepahmansour, Milpitas; Avnish K. Aggarwal, San Jose, all of Calif.

[73] Assignee: Northern Telecom Limited, Nashville, Tenn.

[21] Appl. No.: 274,246

[22] Filed: Jun. 16, 1981

[51] Int. Cl.³ ................ H04M 9/00; H04B 3/00; H04J 3/00
[52] U.S. Cl. .................. 179/2 DP; 179/99 M; 370/110.1
[58] Field of Search ............ 370/110.1, 67, 62, 27, 370/108; 179/99 M, 2 DP

[56] References Cited

U.S. PATENT DOCUMENTS

| | | | |
|---|---|---|---|
| 3,604,857 | 9/1971 | Opferman | 179/99 M |
| 3,922,491 | 11/1975 | Björk et al. | 179/2 DP |
| 3,936,602 | 2/1976 | Korver | 370/27 |
| 4,069,399 | 1/1978 | Barrett et al. | 370/67 |
| 4,076,961 | 2/1978 | Holsinger et al. | 179/2 DP |

*Primary Examiner*—Thomas A. Robinson

*Attorney, Agent, or Firm*—Schwartz, Jeffery, Schwaab, Mack, Blumenthal & Koch

[57] ABSTRACT

A subscriber loop system in association with a TDM telephone system provides voice and data communication with a remote telephone station set and an associated data port. The subscriber loop system includes a voice path and a data path. Supervisory and signalling circuits in the telephone set are used for generating and registering call control signals pertaining to both voice and data calls. The call control signals are labelled and multiplexed with data signals by local and remote line interface circuits for transmission therebetween. A codec in the voice path is caused to couple call progress signals (i.e. dial tone, ring back) to the telephone set during a data call progress, for audible signalling to a user. Changeover relays are connected in combination with the data path and the line interface circuits such that the line interface circuits are bypassed in the event of power failure of the remote line interface circuit, to provide a more direct connection between the signalling and supervision circuits and the TDM telephone system whereby ordinary voice telephone service is maintained in the event of such failure.

8 Claims, 4 Drawing Figures

SUBSCRIBER LOOP SYSTEM FOR VOICE AND DATA

The invention generally relates to apparatus wherein voice and data signals are exchanged between remote stations via a telephone system. More particularly, the invention relates to a subscriber loop system for providing a voice call operation and a data call operation through a time division multiplex (TDM) telephone system.

In a typical TDM pulse code modulated (PCM) communication system for providing voice communication between various associated telephone station sets, voice signals from a station set are encoded into a predetermined PCM signals format for routing through a digital signal switching network in the system. Signals intended for the station set are received from the digital signal switching network and decoded for use in the station set.

One example of a TDM PCM communication system is described by Bruce R. Barrett et al. in U.S. Pat. No. 4,069,399 issued on Jan. 17, 1978. This is a telephone system in which analog voice band signals and signalling and supervision signals are transmitted between a subscriber telephone station set and the TDM PCM communication system via a subscriber loop consisting of a twisted pair of leads. The subscriber loop is terminated at a terminal interface unit which includes a line circuit coupled with a codec for encoding voice signals from the subscriber loop and for decoding PCM signals directed to the subscriber loop and the station set. Alternately, a multiline function or key-like subscriber telephone set is connected to a terminal interface unit via a subscriber loop circuit including two pairs of leads. One of the pairs of leads is part of a voice path used for transmission of analog voice band signals and the other pair of leads is part of a data path in a supervisory signal link between the TDM PCM telephone system and the key-like telephone set. This second pair of leads is used for bidirectional transmission of voice call control diphase signals. An example of a key-like telephone set is described in Telesis, volume 4, number 3, published by Bell-Northern Research Ltd., in the fall of 1975. The key-like telephone set, the associated subscriber loop and interface for same are described at pages 84–90 in an article entitled "The User Interface: SL-1 Terminals And Peripheral Equipment", By J. Audette, R. Hawkins and B. E. Voss. A more detailed description of the supervisory signal link is given by Klass Korver in U.S. Pat. No. 3,936,602 entitled "Full Duplex Data Transmission System Using Two Speeds of Diphase Signal for Simplified Sync.", which issued on Feb. 3, 1976.

Another example of a telephone set coupled with voice and data signal paths is disclosed by David C. Opferman in U.S. Pat. No. 3,604,857, entitled "Line-Oriented Key Telephone System", which issued on Sept. 14, 1971.

A copending U.S. patent application Ser. No. 197,939 was filed on Oct. 17, 1980 and is incorporated herein by reference. In the copending application, Alberto Boleda and Terence Neil Thomas describe "A Digital Subscriber Loop and Interface Circuit". In the copending application it is recognized that a substantial improvement in speed of data transmission can be realized in a telephone system wherein a digital data signal transmission path is completely digital as compared to a data transmission path including an analog portion such as an analog subscriber loop. Accordingly, a universal line interface circuit (ULIC) for coupling digital signals between binary signal facilities and a digital subscriber loop is described. A primary function of the ULIC is that of spreading bunched binary bits, received in a time slot, out over half of a TDM frame period for transmission along a pair of leads in bipolar return to zero (BPRZ) signal format, and that of rebunching bits, received in the BPRZ signal format from a pair of leads, back into a time slot period for transmission to an associated binary signal facility. When the ULIC is used to couple a remote apparatus to the digital subscriber loop, the ULIC also provides clock and timing signals synchronized with timing information inherent in received BPRZ signals. A remote telephone station set associated with the digital subscriber loop is required to provide voice signal conversion, and signalling and supervision interface between a telephone user and the ULIC. If remote data apparatus is also coupled with the ULIC it is likewise required to have an input/output port compatible with the operating binary signal format of the ULIC.

Unfortunately data apparatus presently in use are not directly compatible with the ULIC. Such data apparatus are typically designed to operate with lower speed data transmission for facilities and are usually compatible with an interface standard such as the EIA RS232 standard. Consequently the Digital Subscriber Loop described by Boleda et al., although being advantageous in a completely new system arrangement, is not directly applicable as a modification or retrofit into many of the existing telephone and data communications systems.

Traditionally in telephone systems, telephone station sets are supplied with operating current from an associated switching facility via conductors in the subscriber loop. The operating current available to the station set is limited by the conductor resistance and by the current feed situated between the switching facility power source and the conductors. Telephone station set features in addition to plain ordinary telephone services (POTS), for example a loudspeaking or hands free feature apparatus, tend to be current hungry. Feature apparatus are therefore usually powered by external connection to a local electrical utility supply. In the event of a utility power failure these features are consequently inoperable. However, POTS continues to be available as long as the switching facility continues to supply the required operating current to the telephone station set.

The present invention provides for both voice and data call features in association with existing telephone station sets and loop conductors in a telephone system, for example an electronic private branch exchange (EPBX) having a TDM switching network.

In accordance with the invention POTS and a data communication feature are simultaneously and independently available at a remote terminus of a subscriber loop system. Analog interface circuits couple voice band signals with a voice path in the subscriber loop system. Digital interface circuits couple digital signals with a digital signal path in the subscriber loop system, and signalling and supervisory circuit means interface signalling and supervisory signals, sometimes referred to as call control signals and pertaining to either of the POTS and the data feature with the digital signal path.

A subscriber loop system includes a voice path having a voice loop and interface means for exchanging voice band signals via the voice loop between a TDM telephone system and a telephone set. A separate data path has a data loop for exchanging voice call control signals between a signalling and supervision circuit in the telephone set and the TDM telephone system. An operating current feed supplies current from the TDM telephone system along the voice loop and the data loop for operation of the telephone set. The subscriber loop system also includes a data transmission system which utilizes the data loop and the signalling and supervision circuit in an associated telephone set to provide a data call feature. The data transmission system comprises a data port, a line interface and a remote line interface, whereby indicators and manually operable keys associated with the signalling and supervision circuit in the telephone set serve as a user interface for data calls in addition to voice calls. The line interface multiplexes information signals from the TDM telephone system for transmission along the data loop. These information signals correspond to data signals, data call control signals and the voice call control signals. The line interface also demultiplexes information signals from the data loop to provide data signals for transmission through the TDM telephone system, and data call and voice call control signals for transmission to a controller in the TDM telephone system. The remote line interface multiplexes information signals for transmission along the data loop to the line interface. These signals correspond to data signals from the data port, and data call control signals and voice call control signals from the signalling and supervision circuits in the telephone set. The remote line interface also demultiplexes information signals transmitted along the data loop from the line interface to provide data signals for transmission to the data port, and data call signals and voice call signals for use in the signalling and supervision circuit.

Also in accordance with the invention changeover means are associated with the digital signal path, so that voice supervision signal circuits are directly connectable to the digital signal path, to the exclusion of the digital interface circuits, whereby in the event of failure in a data feature apparatus, POTS remains substantially uninterrupted.

The invention also provides a method for data communication in addition to voice communication via a subscriber loop system having voice and data paths for coupling analog voice signals and call control signals respectively between a TDM telephone system and a remote telephone set which includes keys, indicators and a dial pad for interfacing call progress and control functions with a user. Both data and voice call control signals are interfaced with a user via the keys, indicators and dial pad of the remote telephone set. In accordance with the method a data port is provided in association with the remote telephone set for coupling data signals with the telephone system. Call control signals are distinguished as pertaining to one of a voice call function and a data call function. At opposite ends of the data path, the data signals are multiplexed alternately with one of voice call control signals and data call control signals into a data transmission stream. The data transmission stream is received from the opposite ends of the data path and demultiplexed to provide the call control signals and the data signals.

In accordance with the principles of the invention existing and currently produced TDM telephone systems, for example generally as described in the previously mentioned U.S. Pat. No. 4,069,399, are modified to include digital line interface circuits whereby an analog signal path and a digital signal path for carrying data and supervision information signals are simultaneously provided. However as operating current for a remotely located digital line interface circuit in addition to the normally supplied operating current for the existing telephone station set will normally exceed that available from the existing current feed, the digital line interface circuit and any additional digital apparatus are powered externally from a local electrical utility supply. Supervisory signals which beforehand had been the only signals transmitted along the digital signal path are now multiplexed with data signals. A changeover circuit is responsive to interruption in electrical power from the local utility, for restoring the state of connection of the telephone station set to that of the previous or unmodified state. In the event of an electrical power interruption the changeover provides a path for supervision information signals to be communicated with the TDM telephone system so that POTS at least remains available to a telephone user.

An example embodiment will now be described with reference to the accompanying drawings in which.

Figure 1:
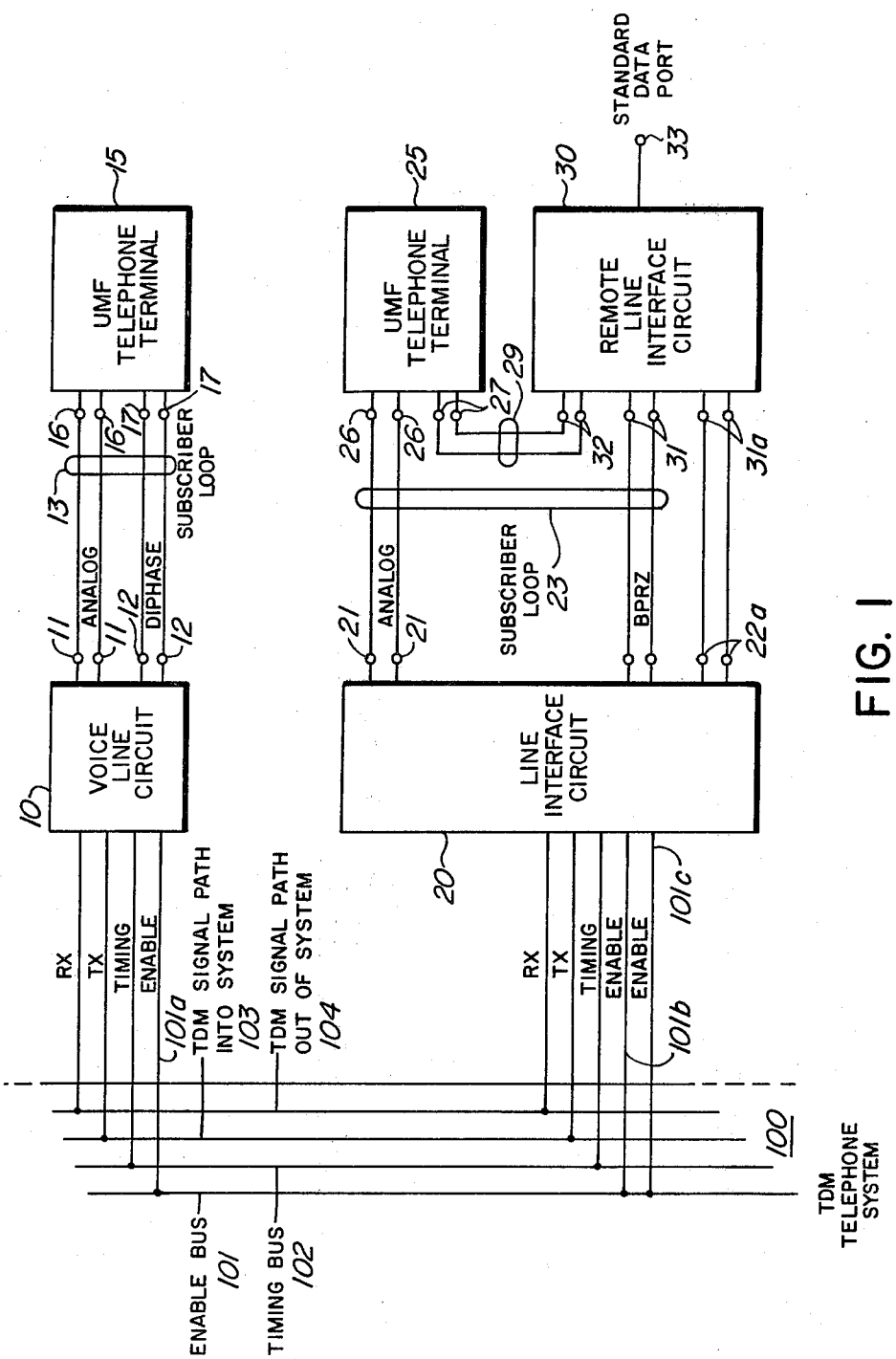
FIG. 1 is a block schematic drawing which illustrates a user multiline function telephone terminal associated with a TDM telephone system, and a combination of a user multiline function telephone terminal and a subscriber loop system for voice and data communications, in accordance with the invention.

The basic structure and operation of a multiline function user telephone terminal associated with a TDM telephone system is here briefly reviewed to provide a basis for discussion of a data communication feature in association with a telephone system in accordance with the invention. Referring to FIG. 1, a TDM telephone system 100 is coupled with a user multiline function (UMF) telephone terminal 15 by way of a subscriber loop 13 and a voice line circuit 10. The arrangement of these elements 100, 15, 13 and 10 is representative of presently available telecommunication systems, one example being the SL-1 (trademark) system available from Northern Telecom Limited, P.O. Box. 6123, Montreal, Quebec, Canada. The TDM telephone system 100 includes a TDM signal path 104 (Rx) for coupling information signals, typically binary encoded voice band signals, to the voice line circuit 10. A TDM signal path 103 (Tx) is provided for coupling information signals from the voice line circuit 10 to the TDM telephone system 100. Timing signals for the operation of the voice line circuit 10 are provided from the TDM telephone system 100 on a timing bus 102. An enable bus 101 includes a plurality of enable leads of which enable leads 101a, 101b and 101c are illustrated.

Briefly in operation, the TDM telephone system 100 provides a TDM digital signal bidirection communication path between the voice line circuit 10 and another voice line circuit or trunk circuit, not shown. With each occurrence of an enable signal supplied by the TDM telephone system 100 on the enable lead 101a, the line circuit 10 is caused to transmit one or more binary bits on the Tx path 104 and to receive a corresponding number of binary bits of the Rx path 103. In addition signalling and supervisory signals are coupled between the voice line circuit 10 and the TDM telephone system 100 with each occurrence of the enable signal on the enable lead 101a during the period of a time slot specifically reserved for this function. In the SL1 system, time slot zero is reserved for this function. The voice line circuit 10 includes a pair of analog terminals 11. The UMF telephone terminal 15, hereafter termed telephone set 15, includes a pair of analog terminals 16. A pair of leads in subscriber loop 13 are connected between the analog terminals 11 and 16 whereby analog voice band signals are exchanged between the line circuit 10 and the telephone set 15. The voice line circuit 10 includes a codec and associated circuits, not shown, for exchanging information in the voice band between the respective digital and analog signal formats whereby voice band communication is available between the telephone set 15 and other telephones, not shown. The voice line circuit 10 also includes a pair of diphase terminals 12 and likewise the telephone set 15 includes a pair of diphase terminals 17. Another pair of leads in the subscriber loop 13 are connected between the diphase terminals 12 and 17 to provide a path for diphase encoded signalling and supervision signal exchange between the voice line circuit 10 and the telephone set 15. A group of registers, not shown, in the telephone set 15 are used to store supervisory and signalling states of the telephone set, for example, directory number selection, hook switch state, dialled digit, ringing, etc. Supervisory and signalling information exchange between the telephone set 15 and the TDM telephone system 100 is provided for by diphase signal apparatus, not shown, in both the voice line circuit 10 and the telephone set 15. An example of a suitable apparatus is described in the previously mentioned U.S. Pat. No. 3,936,602.

In distinction to the above described arrangement for providing voice band telecommunications, the invention provides for data signal telecommunications via TDM telephone facilities, and existing subscriber loops having a pair of leads dedicated to supervision and signalling functions. In the example embodiment illustrated in FIG. 1, a remote line interface circuit 30 is physically added to a UMF telephone terminal 25, hereafter referred to as telephone set 25. The telephone set 25 is the same or similar in structure to the telephone set 15. The remote line interface circuit 30 is physically added to the telephone set 25, in much the same arrangement as for example a companion (trademark) hands free feature module is added to an SL1 telephone terminal. Electrically however, the remote line interface circuit 30 is inserted in series with a pair of diphase terminals 27 of the telephone set 25 and corresponding in function to the diphase terminals 17. The remote line interface circuit 30 and the telephone set 25 are coupled to the TDM telephone system 100 via a line interface circuit 20. The structure of the line interface circuit 20 and the remote line interface circuit 30 is such that simultaneous and virtually independent voice telecommunication and data telecommunication are achieved over an existing subscriber loop 23 and via the TDM telephone system 100, without modification or constraint.

A primary function of this arrangement is that of multiplexing supervisory and signalling information pertaining to voice and data calls and data information of a data call onto two of four leads in a subscriber loop. These leads were previously only utilized for signalling and supervision.

Another primary function is that of being able to automatically revert to operation as described in relation to the telephone set 15 in the event of a power failure associated with the remote line interface circuit 30 or upon removal of the remote line interface circuit 30, whereby normal telephone service remains substantially uninterrupted.

Figure 2:
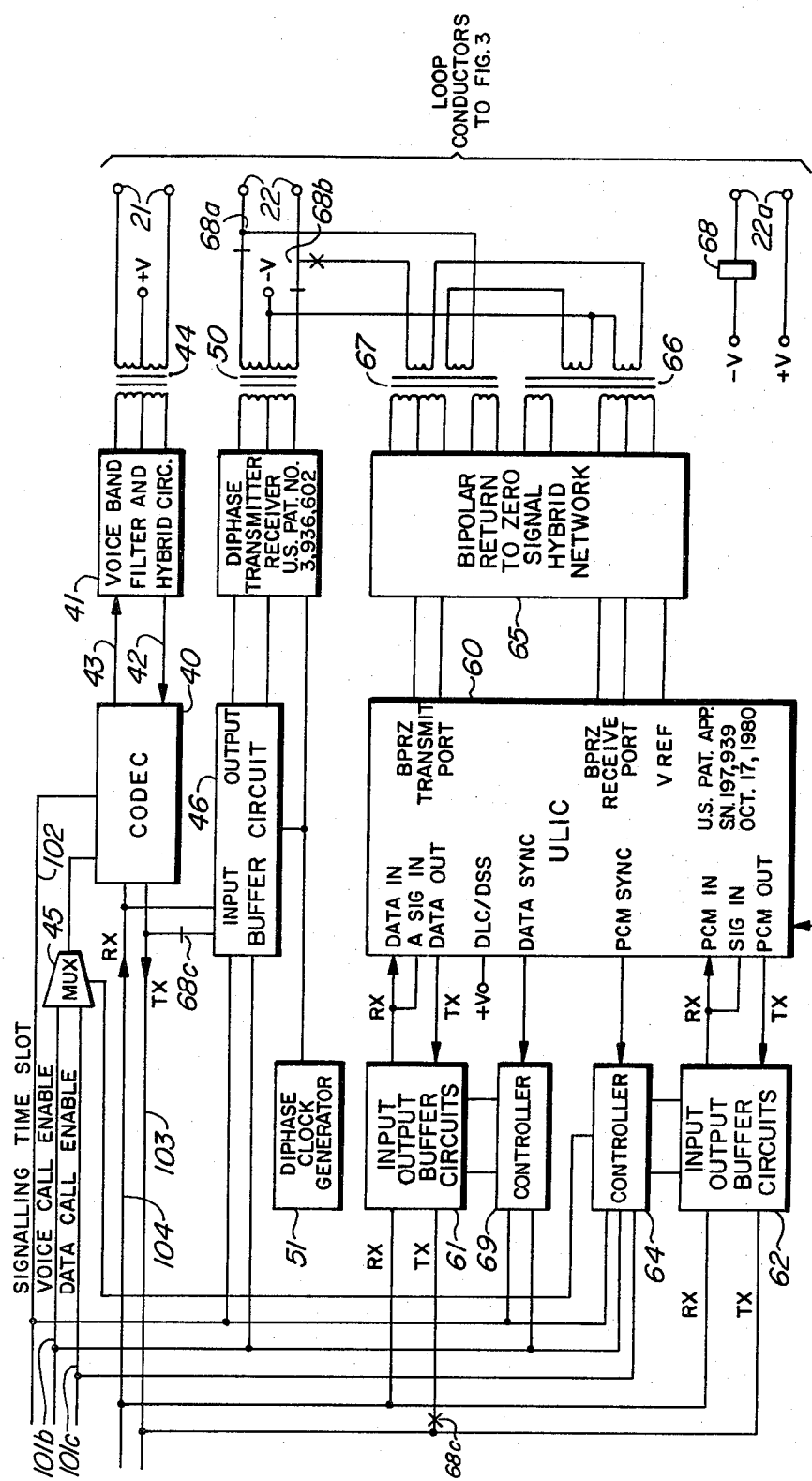
FIG. 2 is a block schematic drawing of a voice line circuit and of a line interface circuit illustrated in FIG. 1.

Referring to FIGS. 1 and 2 the line interface circuit 20 is discussed in more detail. The line interface circuit 20 is connected to the timing bus 102 to receive timing signals for its operation which includes exchanging TDM information signals via the paths Tx and Rx in response to enable signals appearing on enable leads 101b and 101c. In the case of an established voice call, information signals are exchanged with the TDM telephone system 100 during the occurrence of a time slot as indicated by the occurrence of an enable signal on the enable lead 101b. In the case of an established data call, information signals are exchanged with the TDM telephone system during the occurrence of a time slot as indicated by the occurrence of an enable signal on the enable lead 101c.

A portion of the line interface circuit 20 is primarily concerned with interfacing voice band signals between digital and analog signal formats and is also concerned with interfacing supervision and signalling information signals between digital and analog signal formats. This portion of the line interface circuit 20 is similar to the voice line circuit 10 and includes a codec 40 connected to the Tx path 103 and the Rx path 104 for transmitting and receiving binary signals. The codec 40 is also connected to a lead in the timing bus 102 for receiving indication of the occurrence of a signalling time slot to inhibit its binary signal input and output functions during the occurrence of the signalling time slot. The codec 40 is also connected to a voice band filter and hybrid circuit 41 via analog signal transmit and receive leads 42 and 43. The circuit 41 couples the unidirectional signals on the leads 42 and 43 with the pair of terminals 21 via a transformer 44. The transformer 44 includes a center-tapped winding connected to a power source terminal +V for supplying operating current via the terminals 21 to the telephone set 25. The codec 40 is connected to receive enable signals from a multiplexer 45, to cause the codec 40 to transmit binary signal information on the Tx path 103 and to receive binary signal information on the Rx path 104. The multiplexer 45 is usually controlled to pass enable signals from the enable lead 101b, i.e. those enable signals pertaining to a voice call. However as will be explained later, the multiplexer 45 is sometimes controlled to pass enable signals from the enable lead 101c, i.e. those enable signals pertaining to a data call. An input output buffer circuit 46 is connected between the Tx and Rx paths 103 and 104 and a diphase transmitter receiver 47 via leads 48 and 49. The diphase transmitter receiver 47 encodes binary signals received from the lead 48 into a coded diphase signal format for transmission via a transformer 50 and decodes diphase signals received from the transformer 50 for application as binary signals on the lead 49. The transformer 50 includes a centertap winding connected to a power source terminal −V to provide a return path for the operating current. The input output buffer circuit 46 is connected to receive the signalling time slot indication from the timing bus 102 and to receive enable signals from the lead 101b. In the event that the enable signal on the lead 101b and the signalling time slot indication coincide, the circuit 46 receives a predetermined number of bits from the Rx path 104 for transmission via the diphase transmitter receiver 47. The input output buffer circuit 46 also transmits a similar number of bits, previously received from the diphase transmitter receiver 47, on the Tx path 103. A diphase clock generator 51 receives TDM telephone system clock rate signals from the timing bus 102, to generate disphase clock rate signals for timing operations of the input output buffer circuit 46 and the diphase transmitter receiver 47. A break portion of a transfer contact 68c is connected in series between the Tx path 103 and the input output buffer circuit 46 such that when the contact 68c is operated the input output buffer circuit 46 is prevented from transmitting information signals to the TDM telephone system 100. With the exception of the multiplexer 45 and the contact 68c, the voice data line circuit as thus far described in this paragraph also essentially represents the structure of the voice line circuit 10.

The remaining portion of the line interface circuit is concerned with coupling supervision and signalling signals, and data signals, with reference to FIG. 1, between the Tx and Rx paths 103 and 104 and the remote line interface circuit 30 via terminals 22 and 31 and the subscriber loop 23. Referring again to FIG. 2, universal line interface circuit 60 substantially as described in the previously mentioned U.S. patent application Ser. No. 197,939, performs the basic functions of: generating a bipolar return to zero (BPRZ) signal bit stream of sixteen bits corresponding to two bytes of information received from the TDM telephone system 100 during each frame of its operating TDM signal format, and generating two bytes of information corresponding to sixteen BPRZ information bits received during the period of the frame.

The universal line interface circuit (ULIC) 60 includes signal ports corresponding to those described in the previously mentioned patent application. The binary signal ports DATA IN, DATA OUT, PCM IN and PCM OUT are coupled with internal register arrangements which limit the respective input and output characteristics at each port to that of eight bit bursts or bytes occurring once per frame. The input output characteristics are further limited in that in a frame the operation at the data ports must follow the operation at the PCM ports, and is delayed by about one half of a frame period. As one of the objectives of the example embodiment is to provide for data transmission through the TDM telephone system 100 without requiring any modification to the structure and operation of the system 100, input output buffer circuits 61 and 62 are provided to interface the operating signal formats of the TDM telephone system 100 and the ULIC 60, without placing any constraints upon either. A ULIC timing signal generator 63 is connected to receive frame signals and system clock signals from the TDM telephone system 100 on the timing bus 102. These signals are applied to a counter circuit and a decoder circuit, not shown in the generator 63, to generate the timing signals required for the operation of the ULIC 60. A line interface controller 64 is coupled to the input output buffer circuits 61 and 62 and to a control input of the multiplexer 45. Line interface controllers 64 and 69 control the operations of the input output buffer circuits 61 and 62 respectively. The controller 69 is responsive to signals received from the DATA SYNC output port of the ULIC and signals on the data call enable lead 101c. The controller 64 is responsive to signals received from the PCM SYNC output port of the ULIC 60 and signals on voice call enable lead 101b, the data call enable lead 101c and the signalling time slot signal on the timing bus 102, as will be described in greater detail. The ULIC 60 is connected via its BPRZ transmit and receive ports to a BPRZ signal hybrid network 65. The BPRZ signal hybrid network 65 is of conventional design for frequencies in a range including 8 KHz and 128 KHz and functions to couple the unidirectional BPRZ transmit and receive ports of the ULIC 60 to a two-wire transmission line connected as shown to the terminals 22 via a pair of coupling transformers 66 and 67.

Physical changeover between the diphase transmitter receiver 47 and the BPRZ network 65 is provided for by a relay 68 connected in series between the negative voltage terminal −V and one of a pair of terminals 22a. The other of the pair of terminals 22a is connected to the positive voltage terminal +V. The relay 68 includes transfer contacts 68a and 68b, and the previously mentioned transfer contacts 68c. Make portions of the transfer contacts 68a and 68b are connected in series between the terminals 22 and the transformer 67. Break portions of the transfer contacts 68a and 68b are connected in series between the terminals 22 and the transformer 50. The make portion of the transfer contact 68c is connected in series between the Tx path 103 and the input output buffer circuits 61. The negative terminal −V connected as previously described to the transformer 50 is also connected to the centertap of a winding in the transformer 66 so that regardless of the operational state of the transfer contacts 68a and 68b, the path for the energizing current at the terminals 22 is maintained.

Figure 3:
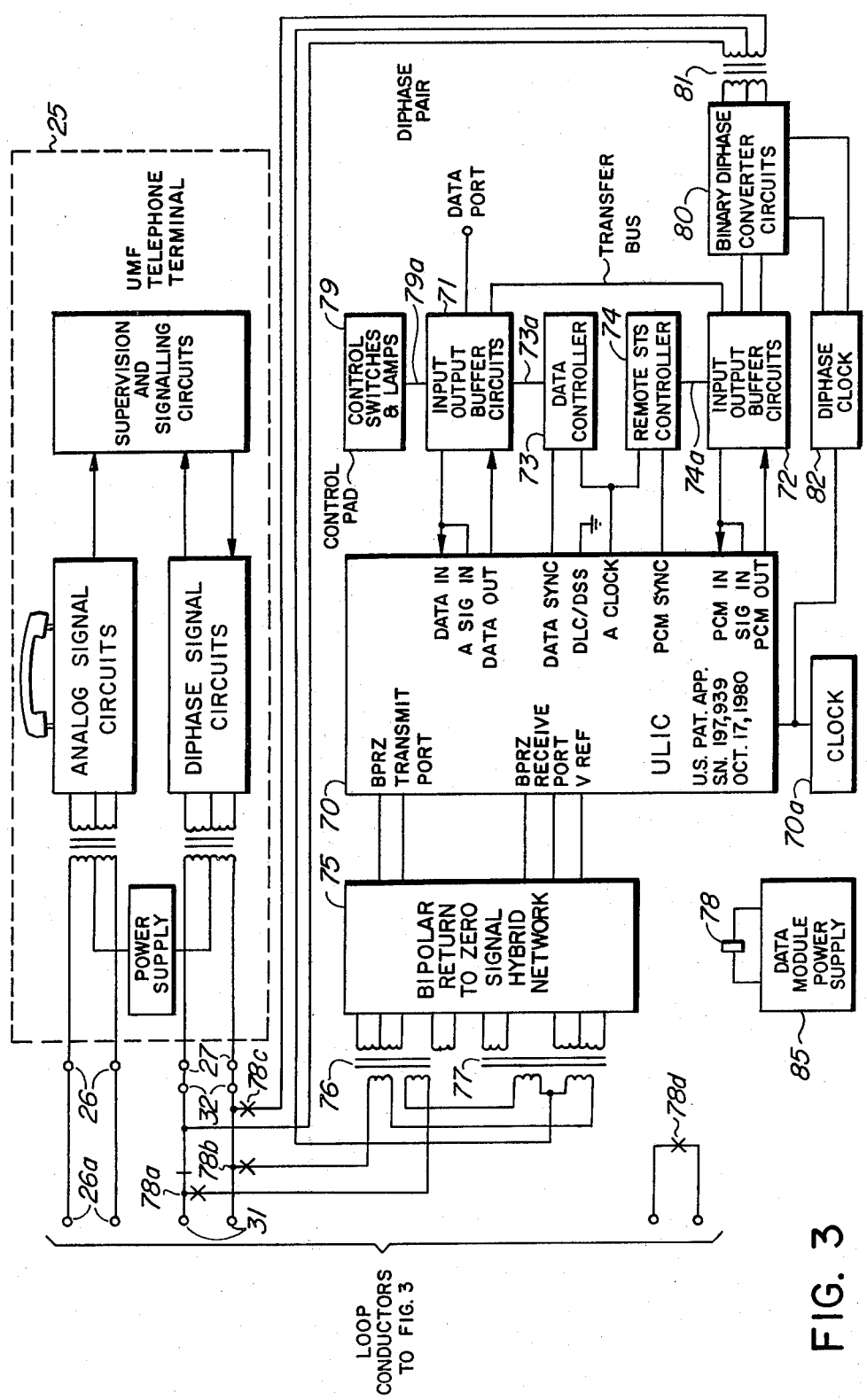
FIG. 3 is a block schematic drawing of the user multiline function telephone terminal and a remote line interface circuit illustrated in FIG. 1.

Referring to FIG. 3 the telephone set 25 in FIG. 1 is shown in more detail. The telephone set 25 includes a power supply for regulating power for operation of its internal elements. The power supply receives operating current from the TDM telephone system 100 via the subscriber loop. The remainder of the elements of FIG. 3, are internal to the remote line interface circuit 30 in FIG. 1 and are powered by a power supply 85 intended for connection to a local source of energizing current which is independent and separate from the TDM telephone system 100.

FIG. 3 includes a ULIC 70, similar in every respect to the ULIC 60 in FIG. 2. The ULIC 70 is coupled in like manner with the subscriber loop by a BPRZ signal hybrid network 75 and associated coupling transformers 76 and 77. A relay 78, is connected across the data module power supply 85 and includes transfer contacts 78a and 78b, and make contacts 78c and 78d. Make portions of the transfer contact 78a and 78b are connected in series between the terminals 31 and the transformer 76. Break portions of the transfer contacts 78a and 78b are connected in series between terminals 31 and the terminals 27. The make contact 78c is connected in series between one of the terminals 27 and one of terminals 32. The make contact 78d is connected in series between a pair of terminals 31a. As illustrated the remote line interface circuit 30 is connected in series between the terminals 31 and 27. In operation the remote line interface circuit 30 is a link in the signalling and supervision function of a telephone call. However should the power supply 85 fail to provide power, the transfer contacts 78a and 78b and the make contact 78c function to isolate the remote line interface circuit and provide direct connection of the telephone set 25 with the subscriber loop 23 via the terminals 31. The make contact 78d also operates to indicate loss of power to the line interface circuit 20, via terminals 31a and 21a. If on the other hand the remote line interface circuit 30 is absent, the terminal 27 is then physically connected to the subscriber loop 23 in place of the terminals 31.

The ULIC 70 includes BPRZ receive and transmit ports connected to the BPRZ signal hybrid network 75. DATA IN and DATA OUT ports are connected to input output buffer circuits 71. PCM IN and PCM OUT ports are connected to input output buffer circuits 72. A DATA SYNC output terminal is connected to a data controller 73 which is connected to control operation of the input output buffer circuits 71 via a control bus 73a. A PCM SYNC output is connected to a remote controller 74 which is connected to control operation of the input output buffer circuits 72 via a control bus 74a. The controllers 73 and 74 are also connected to receive bit rate clock signals from an A CLOCK output of the ULIC 70. A clock source 70a generates clock signals of a frequency similar to the frequency of a system clock in the TDM telephone system 100 and is connected to the ULIC 70 and to an input of a diphase clock 82. The diphase clock 82 includes a counter circuit and a decoder, not shown, to derive clock signals at the diphase rate and at twice the diphase rate for operation of a binary/diphase converter circuit 80 and part of the input output buffer circuit 72. The binary/diphase converter circuits 80 are connected to receive and transmit binary signals at the diphase clock rate to and from the input output buffer circuits 72. The binary/diphase converter circuits 80 are also connected via a transformer 81, the terminals 32 and the terminals 27 to transmit coded diphase signals to the telephone set 25 and to receive diphase signals from the telephone set 25. A control pad 79 includes control switches and lamps, not shown, which are connected to the input output buffer circuits 71 via a bus 79a and provide for selection of manual and automatic modes of operation and for visual indication of data call supervision in addition to the signalling and supervision functions inherently available through the telephone set 25. A transfer bus 84 provides a communication path between the data controller 73 and the remote controller 74 via the respective buffer circuits 71 and 72.

The operation as it pertains to sharing of subscriber loop conductors for data call communication and for signalling and supervision of voice and data calls is the function of the ULICs 60 and 70. Data information signals are handled via the DATA IN and DATA OUT ports in 8 bit bytes. Signalling and supervision signals are handled via the PCM IN and PCM OUT ports. The PCM ports also operate in an 8 bit byte format however only 7 bits are used for information transfer in order to avoid confusion with a zero code suppression function of the ULICs. Designation and detection as to whether an instant signalling or supervision signal message pertains to a voice call or a data call is provided by the controller 64 in FIG. 2 and by the remote controller 74 in FIG. 3, in combination with the respective buffer circuits 62 and 72. Receipt and transmission of data signals via the data port 33 is in a data standard signal format, for example the EIA RS232 format, and is the function of the input output buffer circuits 71 under the direction of the data controller 73. Receipt and transmission of data signals via the Tx and Rx paths 103 and 104 in the operating format of the TDM telephone system 100 is the function of the input output buffer circuits 61 under the direction of the controller 69.

Figure 4:
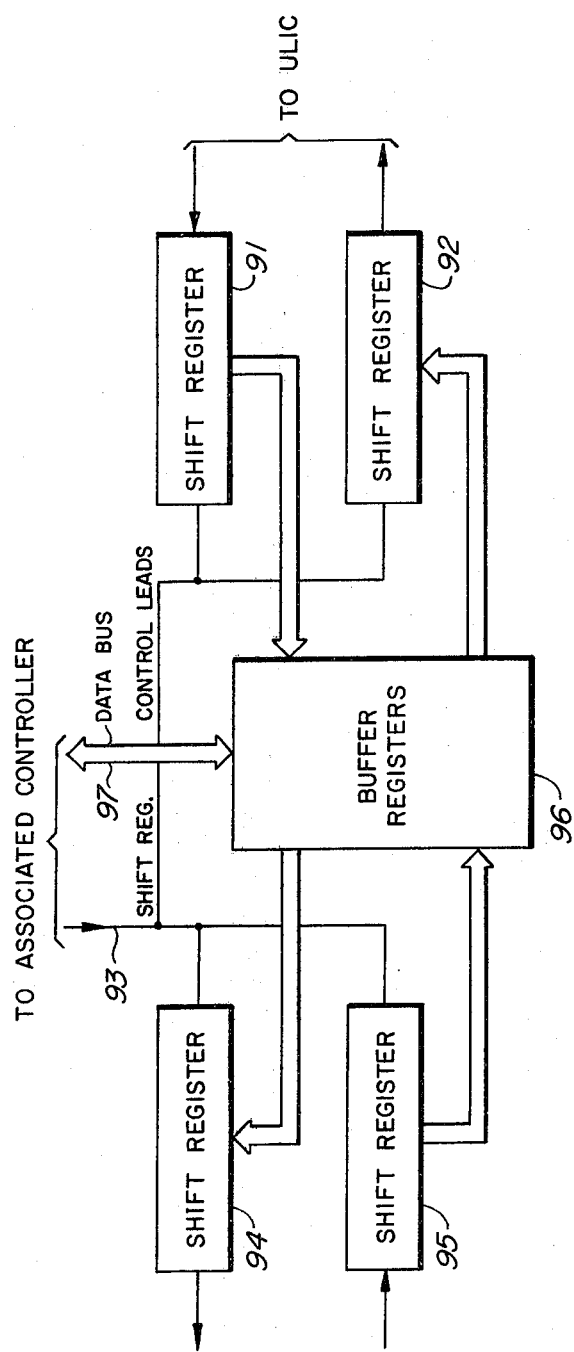
FIG. 4 is a block schematic drawing of input output buffer circuits used in one implementation of FIGS. 2 and 3.

Various internal structures of the input output buffer circuit 61 will be readily apparent to persons skilled in the digital signal electronic arts. A general example is illustrated in FIG. 4 and includes a first pair of shift registers 91 and 92 for respectively receiving and transmitting serial byte bursts of binary signals from and to associated data ports of ULIC 60 or 70 as directed by an associated controller via control leads 93. A second pair of shift registers 94 and 95 respectively receive and transmit serial binary signals as directed by the controller. The controller receives signals from the DATA SYNC port, or the PCM SYNC port, as the case may be and where appropriate it receives signals on the voice call enable lead 101b or the data call enable lead 101c and the signalling time slot signal from the timing bus 102, for its operation.

Buffer registers 96 provide for parallel data transfer from the shift register 91 to the shift register 94 and from the shift register 95 to the shift register 92. In one example the associated controller consists of simple logic circuits which are responsive to the available enable and timing signals to control the operation of the above-mentioned registers 91–96 via the control leads 93. In another example the controller includes a processor programmed to perform one or more of the following operations; to accommodate operating signal formats of more than one type of TDM communications system, and to introduce, extract and respond to control and/or checking codes, via communications with the buffer registers 96 through data leads 97, in order to enhance data information integrity.

The input output buffer circuits 61, 62, 71 and 72 are similar to the structure illustrated in FIG. 4 with two exceptions. The first exception is that the input output buffer circuits 61 do not require the buffer registers 96, the shift registers 91 and 94 are connected directly together, and the shift registers 92 and 95 are connected directly together. The second exception is that in the input output buffer circuit 71, the shift registers 94 and 95 are replaced with a universal asynchronous receiver transmitter (UART) which provides the interface between the data port 33 and the buffer registers 96. Each of the controllers 64, 73 and 74 includes a microprocessor and a read only memory (ROM) not shown. Each of the ROMs contains firmware instructions pertinent to the operation of its associated input output buffer circuits.

In operation of the input output buffer circuits 62, for example, the controller 64 causes the internal buffer registers 96 to store call control signals from the ULIC 60 in a voice call storage area or in a data call storage area, in accordance with the associated identifying labels. When the controller in the TDM telephone system 100 is ready to receive call control signals it causes the appropriate enable signal to be received by the controller 64 coincident with the signalling time slot indication. The content of the voice call storage area or the data call storage area, in accordance with the enable signals, is then transferred to the shift register 94 and shifted serially onto the Tx signal path 103.

Hardware and firmware details of any particular example of the system herein described depend in practice upon selection choice among readily available circuit packages and a choice as to a working protocol for data, supervision and signalling signals. Persons skilled in the art of digital electronics or digital telephony with reference to this description will become aware of various circuits adaptable in combination to implement the following described functions, particularly with reference to any of a number of publications regarding microprocessor systems. One example of such a publication is the "MCS-48 User's Manual", published in July 1978 by Intel Corp., 3065 Bowers Ave., Santa Clara, Calif. 95051, U.S.A.

Assuming that the telephone set 25 is in an "idle" state a typical data call to a remote data port not shown but associated with the TDM telephone system 100 is made as follows. In the control pad 79, depression of a data directory number (DDN) key, not shown, causes DDN shift lamps, not shown, to be illuminated and audible dial tone to be produced by a transducer, not shown, in the associated telephone set 25. When the directory number of the remote data port is dialled at the telephone set 25, dialling of a first digit causes the dial tone to be terminated. After the last digit of the directory number is dialled, a ringback tone is audible from the telephone set 25. At the called data port, indication of a call is given visually by winking of the DDN lamp in the associated control pad. When a remote line interface unit associated with the remote data port indicates the call is answered, the ringback is terminated and in the control pad 79, the shift lamp is extinguished and a connect lamp, not shown, is illuminated. At the called data port, the DDN lamp becomes steadily illuminated and the connect lamp in the control pad 79 is illuminated. At this moment a data communication path is established between the calling and called data ports. It is now possible to make a normal voice call from the telephone set 25 without disturbing the data call. The data call is terminated with depression of a shift key in the control pad 79 and thereafter by depression of a release (RLS) key in the telephone set 25. This causes the DDN and connect lamps associated with the calling and called data ports to be extinguished.

During the data call, the controller 64, the remote controller 74, the data controller 73 and the respective input output buffer registers 62, 72 and 71 in combination control and perform the following functions. Initially when the DDN key is depressed to initiate the data call, the remote controller 74 detects the depression and then examines the state of the associated DDN lamp. Since the lamp is off the remote controller 74 sends a message to the controller 64. This message is the same as that which would normally be generated if the directory number (DN) key on the telephone set 25 or on the telephone set 15 were depressed, except that it is detected by the TDM telephone system as coming from the line interface circuit associated with the enable lead 101c. The shift lamp in the control pad 79 is illuminated indicating to the user that key depressions at the telephone set 25 will have the effect of data call key depressions. A signalling and supervison message is sent to the controller 64 to cause the codec 40 to be enabled during data call enable signals on the lead 101c via the multiplexer 45 so that the data call related call progress tones generated in the TDM telephone system 100 are audible at the telephone set 25. When the TDM telephone system 100 receives the DDN key depression message, it supplies dial tone as in a typical telephone call and sends a message directing that the DDN lamp be illuminated. This message is received by the controller 64 and thereafter transmitted to the remote controller 74. The controller 74 decodes the message and thereafter sends a command via the transfer bus 84 to illuminate the DDN lamp in the control pad 79. At this moment the DDN lamp and the shift lamp are both illuminated and dial tone is audible.

When the user dials the number of a remote data port, the first number key depression results in dialtone being removed by the TDM telephone system 100. When dialling of the directory number is complete, ringback tone is supplied by the TDM telephone system 100 and a message is sent to the called data port to wink illuminate the associated DDN lamp.

As soon as the data call is originated the calling remote controller 74 gives indication to the associated data controller 73 that a data call is in progress. The data controller 73 is caused to wait to establish communication with a corresponding data controller associated with called data port. Similarly when a called remote controller detects the presence of an incoming data call it gives indication to the associated data controller that a data call is in progress. The data controller at the called end goes into a state where it sends idle messages continuously toward the TDM telephone system via the DATA ports of its associated ULICs. However as a path through the TDM telephone system 100 is not yet established, these messages are not received.

At the called data port the remote controller checks the data controller to determine if the control pad is set for an automatic answer mode as would be the case if the data port were connected to unattended apparatus, for example a computer. If so, the remote controller constructs a signalling and supervision message for indicating to the TDM telephone system 100 the equivalent of an appropriate DDN key is being depressed. When the TDM telephone system 100 receives the DDN key depression message, it establishes a telephone network connection between the calling and called data ports. Ringback tone is removed from the telephone set 25. As soon as the respective data controllers have exchanged all the necessary control information, the data controller 73, associated with the calling data port, indicates to the remote controller 74, via the transfer bus 84, that a communication path is established. Subsequently the remote controller 74 proceeds to extinguish the shift lamp in the control pad 79 and to send a message to the controller 64 to control the multiplexer 45 so that the codec 40 returns to being responsive to enable signals on the voice call enable lead 101b. Also the remote controllers associated with the calling and called data ports cause the connect lamps in the respective control pads to be illuminated, indicating an established data call. At this time the telephone sets associated with the calling and called data ports are free for making independent voice telephone calls.

Since a network path as now been established, the idle messages being sent from the data controller associated with the called data port are now being received by the data controller 73 associated with the calling data port 33. The two data controllers now proceed to exchange control information, for example the baud rate at which data apparatus connected at the respective data ports are operable. After the control information is exchanged, the UART in the input output buffer circuit 71 is controlled to operate at the baud rate common to the apparatus associated with the calling and called data ports respectively. Similarly a UART in the corresponding input output buffer circuits associated with the called data port is likewise controlled. The respective data controllers are now ready to facilitate exchange of data information between the respective data ports. In one example, a data byte for example at the data port 33 is detected by the data controller 73, the data controller constructs a message containing a data byte and a header. This message is sent via the ULICs 70 and 60 and the TDM telephone system 100 toward the called data port. The message is decoded by the corresponding data controller and presented to the corresponding UART for transmission via the called data port. Data information originating at the called data port likewise is transmitted to the calling data port.

The data call is released when the shift key in the control pad 79 associated with the calling data port 33 is depressed. This causes the remote controller 74 to illuminate the shift lamp and subsequently when the RLS key in the telephone set 25 is depressed, the remote controller 74 receives the release message via the diphase pair 29. The remote controller 74 sends the release message to the controller 64 with the message originator specified as being the data port. The controller 64 accordingly transfers the release message to the TDM telephone system 100 during enable signal occurrences on the enable lead 101c, in the presence of time slot zero occurrences as indicated on the timing bus 102. When the TDM telephone system 100 receives the release message it cancels the communication path and sends signalling and supervision messages toward both the data ports to return the data modules to the idle states.

What is claimed is:

1. A subscriber loop system for providing a voice call operation along a first conductor path between a user multiline function (UMF) telephone terminal and a time division multiplex (TDM) telephone system, and for providing a data call operation along a second conductor path between a data port and the TDM telephone system, the TDM system providing at least one signalling and supervision (SS) path for communication with a controller in the TDM telephone system, and providing a plurality of time divided communication paths for communication through the TDM telephone system, the UMF telephone terminal including an SS circuit for storing dial pad and key depressions for transmission to the controller and for storing signalling states transmitted from the controller, the subscriber loop system comprising:

a line interface means including;
a codec responsive to an enable signal directed thereto by the TDM telephone system, for receiving analog information signals from the first conductor path and encoding said information signals to provide corresponding digital information signals for transmission along one of the plurality of communication paths as designated by the enable signal and for receiving digital information signals from the designated communication path and decoding said information signals to provide corresponding analog information signals for transmission along the first conductor path, digital circuits for exchanging data and SS information signals between the second conductor path and the TDM telephone system, the digital circuits being responsive to an enable signal directed thereto by the TDM telephone system for receiving digital information signals from one of the plurality of communication paths as designated by the enable signal and converting said information signals to corresponding information signals in an operating signal format of the second conductor path, for transmission along the second conductor path, and for receiving information signals in the operating signal format of the second conductor path and converting said information signals to corresponding information signals in an operating signal format of the plurality of communication paths, a voice call storage means and a data call storage means, included in the digital circuits, for storing digital SS information signals corresponding to SS information signals received by the digital circuits in the operating signal format of the second conductor path and pertaining to SS functions of voice calls and of data calls respectively, for transmission along the SS path, and;

a line controller connected to the digital circuit for controlling operation of the digital circuits in exchanges of SS information signals between the second conductor path and the SS path, the line controller being responsive to the designation of the SS path and an assertion of either of the two previously mentioned enable signals to;
(a) cause the digital circuits to receive digital SS information signals from the SS path,
(b) label the received SS information signals to provide voice call and data call information signals in accordance with which of the two enable signals is asserted,
(c) cause the digital circuits to transmit SS information signals corresponding to the labelled SS information signals along the second conductor path,
(d) cue SS information signals, received by the digital circuits from the second conductor path, in the voice call storage means and in the data call storage means in accordance with voice call and data call labels received in association with the SS information signals, and
(e) cause the digital circuits to pass signal contents of the voice call storage means and the data call storage means to the SS path in accordance with respective assertions of the enable signals;

a remote line interface means including;
digital circuits for exchanging data information signals between the data port and the second conductor path and for exchanging SS information signals between the SS circuit of the UMF telephone terminal and the second conductor path, the ditigal circuits being responsive to a time defining characteristics in the information signals transmitted from the first line interface means along the second conductor path for converting data information signals received from the second conductor path to corresponding digital signals compatible with a predetermined operating signal format of the data port for transmission to the data port, and for converting data information signals received from the data port to corresponding data information signals compatible with the operating signal format of the second conductor path for transmission along the second conductor path to the first line interface means, and also, for converting SS information signals received from the second conductor path to corresponding SS information in a signal format compatible with operation of the SS circuit for transmission to the SS circuits and for receiving SS information signals from the SS circuit and converting said SS information signals to corresponding SS information signals compatible with the operating signal format of the second conductor path for transmission along the second conductor path to the first line interface means, a shift key manually operable by a user for designating functions of SS information signals originating at the UMF telephone terminal as pertaining to a voice call and alternately to a data call, a directory number key and a directory number indicator, the directory number key being manually operable by a user to request service for a data call, a remote line controller connected to the digital circuits and being responsive to designation at the shift key to label SS information signals for transmission along the second conductor path as pertaining to one of a voice call and a data call, and being responsive to a request for service at the directory number key for generating data call labelled SS information signals corresponding to a request for service code for transmission via the digital circuits and the second conductor path to the first line interface means, and being responsive to SS information signals labelled as pertaining to a data call and corresponding to either of service initiated and service terminated codes for accordingly causing a corresponding indication at the directory number indicator.

2. A subscriber loop system as defined in claim 1 wherein the line controller is also responsive to a request for service code from the remote line controller followed by a service initiated code in response thereto from the TDM telephone system for asserting a switch codec signal, the subscriber loop system further comprising:

gating means for directing the enable signal associated with a data call to the codec during assertion of the switch codec signal, whereby audible signalling normally associated with progress of a voice call is available at the associated UMF telephone terminal during progress of a data call.

3. A subscriber loop system as defined in claims 1 or 2 further comprising:

a control conductor path for connection between the line interface means and the remote line interface means;

in the line interface means, SS interface means responsive to designation of the SS path and assertion of the first mentioned enable signal for converting digital SS information signals from the SS path to corresponding SS information signals compatible with operation of the SS circuit in the UMF telephone terminal and for converting SS information signals from the UMF telephone terminal to corresponding SS information signals compatible with the operating signal format of the SS path for transmission along the SS path, changeover means connecting the digital circuits to the second conductor path and responsive to a changeover signal for disconnecting the digital circuits from the second conductor path, connecting the SS interface means to the second conductor path and providing access for transmission along the SS path;

in the remote line interface means, a remote changeover means for connecting the remote line interface means to the second conductor and the SS circuit of the UMF telephone terminal, the remote changeover means being responsive to a failure of the local power supply for disconnecting the remote line interface means from the second conductor path and the UMF telephone terminal, for connecting the second conductor path directly to the UMF telephone, and for transmitting the changeover signal to the first line interface means via the control conductor path.

4. A subscriber loop system including a voice path having a voice loop and interface means for exchanging voice band signals, via the voice loop, between a TDM telephone system and a telephone set; a separate data path having a data loop for exchanging voice call control signals between a signalling and supervision circuit in the telephone set and the TDM telephone system; feed means for supplying operating current from the TDM telephone system along said loops for operation of the telephone set; and a data transmission system for utilizing the data loop and the signalling and supervision circuit to provide a data call feature, the data transmission system comprising:

a data port;

a line interface means for multiplexing information signals, the information signals corresponding to data signals, data call control signals and the voice call control signals from the TDM telephone system, for transmission along said data loop, and for demultiplexing information signals from the data loop to provide data signals, for transmission through the TDM telephone system, and data call control signals and voice call control signals for transmission to a controller in the TDM telephone system;

a remote line interface means for multiplexing information signals, the information signals corresponding to data signals from the data port, data call control signals and voice call control signals from the signalling and supervision circuit, for transmission along said data loop to the line interface means, and for demultiplexing information signals transmitted along the data loop from the line interface means to provide data signals for transmission to the data port, and data call and voice call control signals for use in the signalling and supervision circuit whereby indicators and manually operable keys associated with the signalling and supervision circuit serve as a user interface for data calls in addition to voice calls.

5. A subscriber loop system as defined in claim 4 wherein the interface means in the voice path is responsive to call enable signals coupled from the TDM telephone system for exchanging said voice band signals, the line interface means is responsive to a data call control signal corresponding to a request for service code from the remote line interface means, followed by a service initiated code being asserted in response thereto by the TDM telephone system, for asserting a switch signal, the subscriber loop system further comprising:

gating means responsive to the switch signal for coupling data call enable signals generated in the TDM telephone system to the interface means to cause encoded call progress tone signals to be interfaced with the voice loop;

whereby call progress tone signals generated in the TDM telephone system and related to the progress of the data call are audibly available to a user at the telephone set.

6. In a subscriber loop system as defined in claims 4 or 5 the data transmission system further comprising:

in the remote line interface means, a power supply operable from a source of power other than a source of power related to the TDM telephone for supplying operating current to the remote line interface means, and changeover means for connecting the remote line interface means in series between the telephone set and the data loop in response to operating current from the power supply and in the absence of said operating current for disconnecting the remote line interface means and directly connecting the data loop to the telephone set, and for generating a changeover signal, in the line interface means, changeover means responsive to the changeover signal for connecting the interface means to the data loop, and for disconnecting the line interface means, whereby in the event that operating current is unavailable at the remote line interface means, voice call control signals continue to be exchanged between the telephone set and the controller in the TDM telephone system via the interface means and the data loop.

7. A method for providing data communication in addition to voice communication via a subscriber loop system having voice and data paths for coupling analog voice signals and call control signals respectively between a TDM telephone system and a remote telephone set having dial pad, keys, indicators and a dial pad for interfacing call progress and control function with a user, the method comprising the steps of:

(a) providing a data port in association with the remote telephone set;

(b) distinguishing call control signals as pertaining to one of a voice call function and a data call function; and at opposite ends of the data path, (c) multiplexing data signals alternately with one of voice call control signals and data call control signals into a data transmission stream, (d) receiving the data transmission stream from the opposite end, and (e) demultiplexing the received data transmission to provide the call control signals and the data signals;

whereby at the remote telephone set both data and voice call control signals are interfaced with a user via the dial pad, keys and indicators.

8. A subscriber loop system including interface circuitry for interfacing conductor paths in a subscriber loop with a telephone system, and remote apparatus connected with the subscriber loop, the remote apparatus including a centrally energized portion which depends on energizing current from the telephone system for its operation and a remotely energized portion which depends on energizing current from another source for its operation, the subscriber loop system being characterized by:

said interface circuitry having a first configuration for normal operation and including changeover means responsive to a changeover signal for switching the interface circuit into a second configuration for limited operation;

said remote apparatus having a first configuration for normal operation and including a remote changeover means responsive to interruption of the energizing current from said other source for switching the remote interface circuit into a second configuration for a limited operation of the centrally energized portion, and for generating the changeover signal; and means in the subscriber loop system for coupling the changeover signal from the remote apparatus to the line interface circuitry.

* * * * *